United States Patent
Xu

(10) Patent No.: US 10,329,920 B2
(45) Date of Patent: Jun. 25, 2019

(54) MULTI-LOBED COOLING HOLE

(71) Applicant: United Technologies Corporation, Hartford, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 627 days.

(21) Appl. No.: 14/775,015

(22) PCT Filed: Mar. 11, 2014

(86) PCT No.: PCT/US2014/023346
§ 371 (c)(1),
(2) Date: Sep. 11, 2015

(87) PCT Pub. No.: WO2014/197043
PCT Pub. Date: Dec. 11, 2014

(65) Prior Publication Data
US 2016/0024937 A1  Jan. 28, 2016

Related U.S. Application Data

(60) Provisional application No. 61/788,487, filed on Mar. 15, 2013.

(51) Int. Cl.
*F01D 5/08* (2006.01)
*F01D 5/18* (2006.01)
*F01D 9/06* (2006.01)

(52) U.S. Cl.
CPC ............ *F01D 5/186* (2013.01); *F01D 9/065* (2013.01); *F05D 2240/11* (2013.01);
(Continued)

(58) Field of Classification Search
None
See application file for complete search history.

(56) References Cited

U.S. PATENT DOCUMENTS 7,997,868 B1 * 8/2011 Liang ................. F01D 5/186
416/97 R
2005/0286998 A1  12/2005 Lee et al.
(Continued)

FOREIGN PATENT DOCUMENTS

EP  2716866 A2  4/2014
WO  WO2013122906 A1  8/2013
(Continued)

OTHER PUBLICATIONS

Extended European Search Report for EP Application No. 14807314.1, Dated Nov. 2, 2016, 9 Pages.
(Continued)

*Primary Examiner* — Kayla McCaffrey
(74) *Attorney, Agent, or Firm* — Kinney & Lange, P.A.

(57) ABSTRACT

A gas turbine engine component subjected to a flow of high temperature gas includes a wall having first and second surfaces and a cooling hole extending through the wall. The cooling hole includes an inlet located at the first surface, an outlet located at the second surface, a metering section extending downstream from the inlet, and a diffusing section extending from the metering section to the outlet. The diffusing section includes a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance different from the first, and a transition region positioned between the lobes, the transition region having a third downstream end adjacent the outlet.

12 Claims, 6 Drawing Sheets

(52) U.S. Cl.
CPC ...... *F05D 2240/81* (2013.01); *F05D 2250/73* (2013.01); *F05D 2260/202* (2013.01); *F23R 2900/03042* (2013.01); *Y02T 50/676* (2013.01)

(56) References Cited

U.S. PATENT DOCUMENTS

| | | |
|---|---|---|
| 2010/0068068 A1 | 3/2010 | Liang |
| 2011/0097191 A1 | 4/2011 | Bunker |
| 2012/0167389 A1 | 7/2012 | Lacy et al. |
| 2013/0294889 A1* | 11/2013 | Malak ............... F01D 5/186 415/115 |

FOREIGN PATENT DOCUMENTS

| | | |
|---|---|---|
| WO | WO2013165507 A2 | 11/2013 |
| WO | WO2013165509 A2 | 11/2013 |

OTHER PUBLICATIONS

International Searching Authority, PCT Notification of Transmittal of the International Search Report and the Written Opinion, dated Dec. 23, 2014, 14 pages.

* cited by examiner

MULTI-LOBED COOLING HOLE

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component subjected to a flow of high temperature gas includes a wall having first and second wall surfaces and a cooling hole extending through the wall. The cooling hole includes an inlet located at the first wall surface, an outlet located at the second wall surface, a metering section extending downstream from the inlet, and a diffusing section extending from the metering section to the outlet. The diffusing section includes a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance different from the first distance, and a first transition region positioned between the first and second lobes, the first transition region having a third downstream end adjacent the outlet.

A wall of a component of a gas turbine engine subjected to a flow of high temperature gas includes first and second wall surfaces, an inlet located at the first wall surface, an outlet located at the second wall surface, a metering section commencing at the inlet and extending downstream from the inlet, and a diffusing section extending from the metering section and terminating at the outlet. The diffusing section includes a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance different from the first distance, and a first transition region positioned between the first and second lobes, the first transition region having a third downstream end adjacent the outlet.

A gas turbine engine component subjected to a flow of high temperature gas includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance greater than the first distance, and a third lobe spaced from the first lobe by the second lobe and diverging longitudinally and laterally from the metering section and having a fifth downstream end spaced from the inlet by a third distance, wherein the first and third distances are substantially equal.

DETAILED DESCRIPTION

Figure 1:
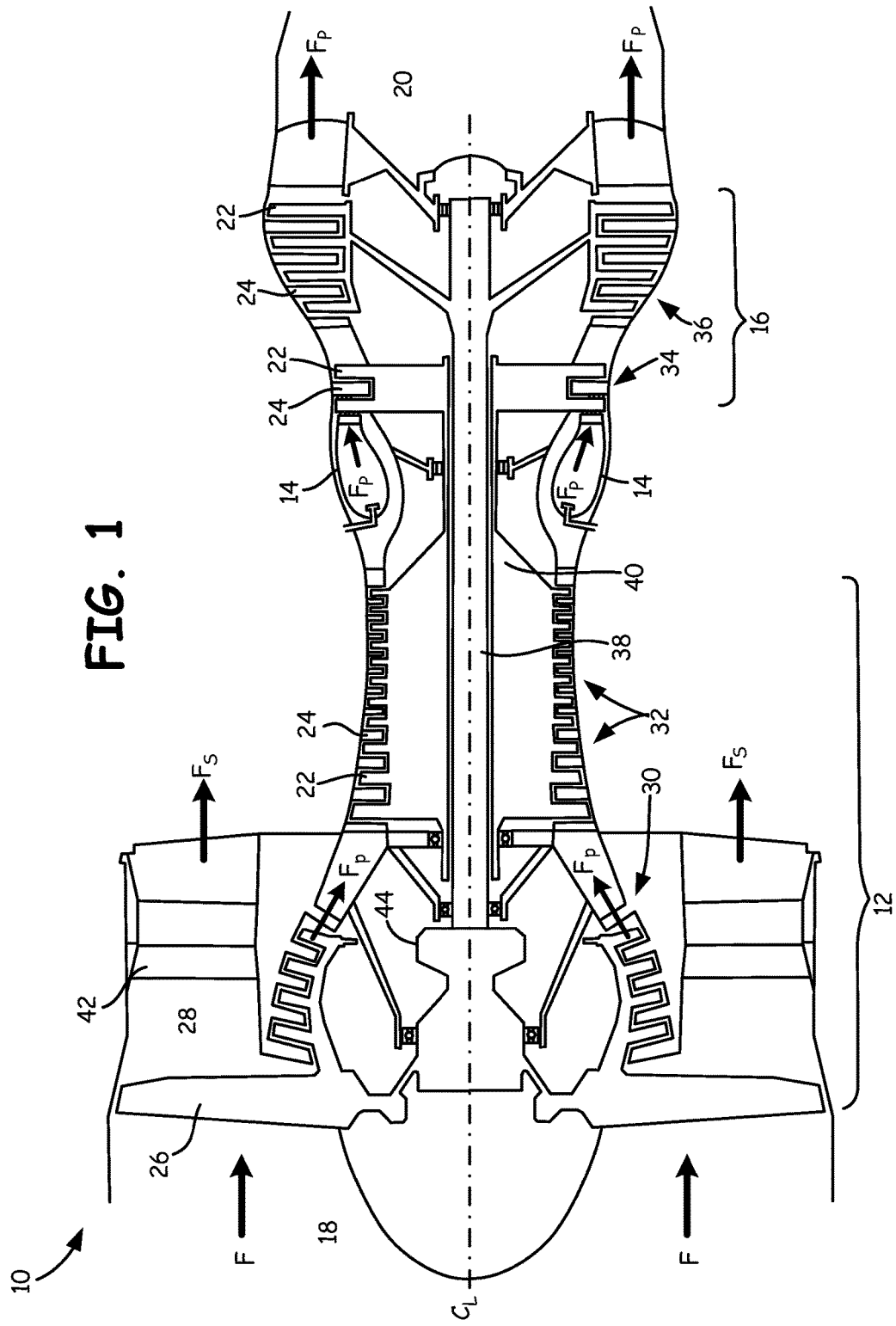
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
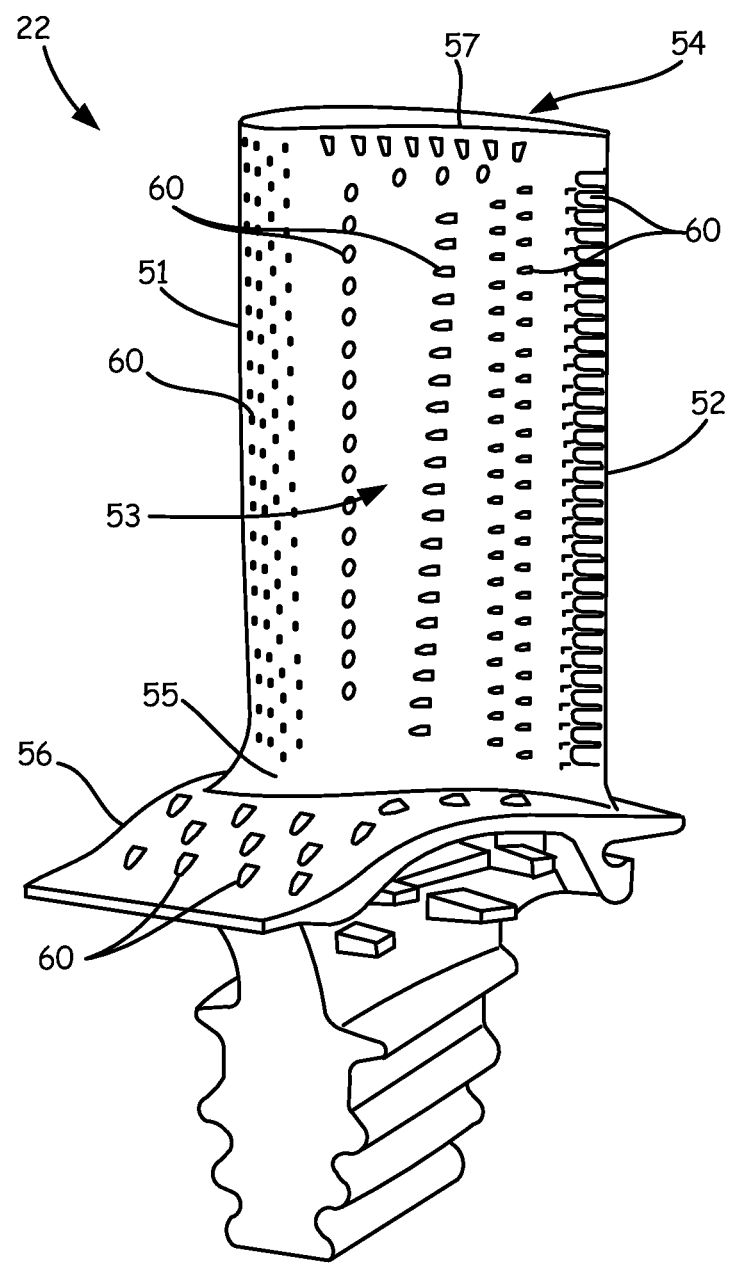
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
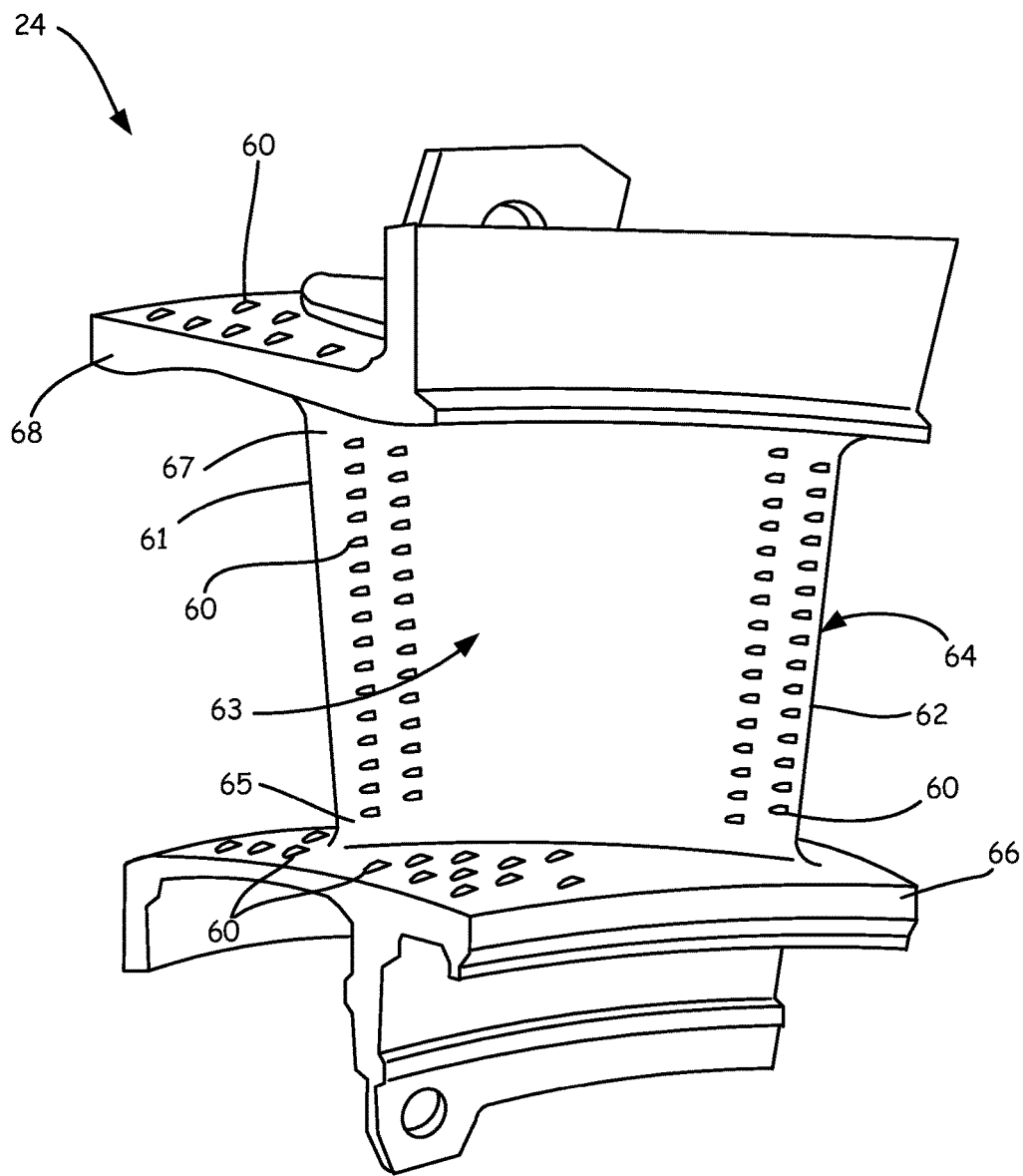
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
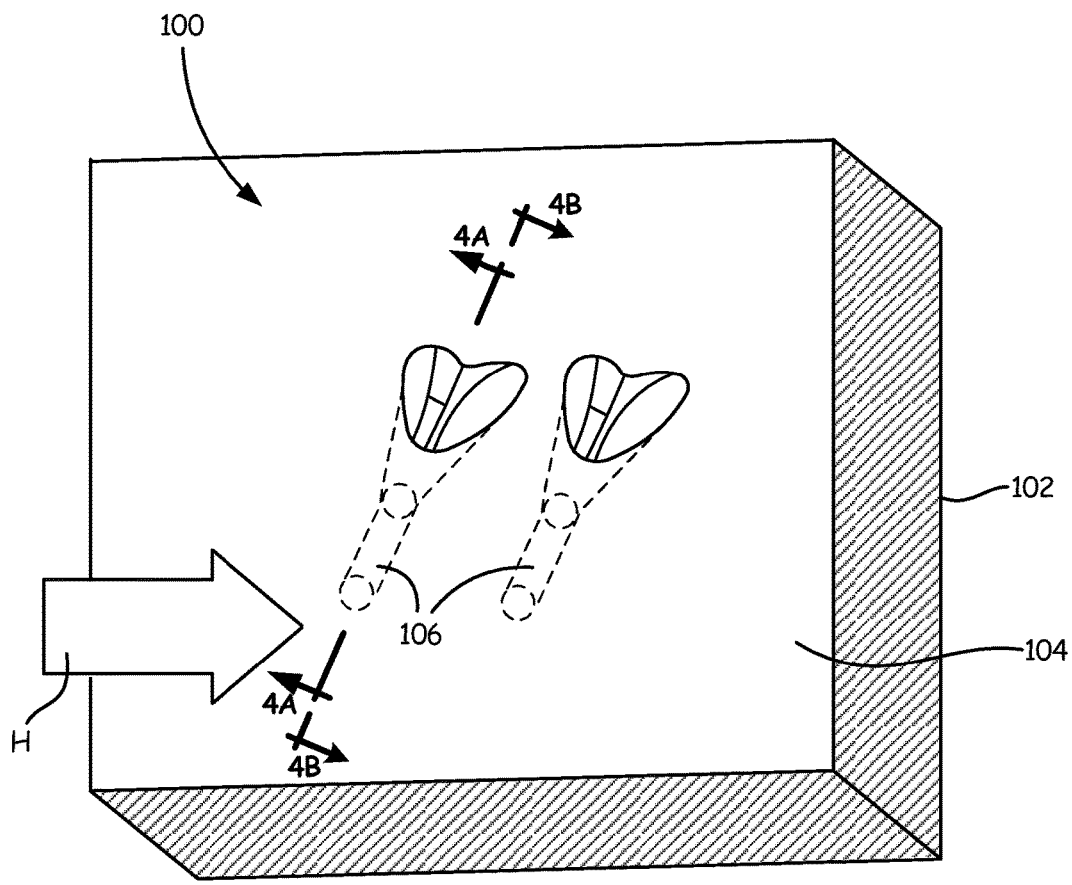
FIG. 3 is a view of a wall having multi-lobed cooling holes.

FIG. 3 illustrates a view of a wall having cooling holes. Wall 100 includes first wall surface 102 and second wall surface 104. As described in greater detail below, wall 100 is metallic and second wall surface 104 can include a thermal barrier coating. Cooling holes 106 are oriented so that their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106, with cooling air flowing through each of the lobes in the diffusing section. Cooling holes 106 can be arranged in a row on wall 100 as shown in FIG. 3 and positioned so that a longitudinal axis of the cooling hole is substantially different from the general direction of the high temperature gases flowing past wall 100. In this embodiment, cooling air passing through cooling holes 106 travels in a different direction with respect to the high temperature gases flowing along second wall surface 104 (represented by arrow H). In other embodiments, the cooling air passing through cooling holes 106 is substantially parallel to the high temperature gases. Here, the row of cooling holes 106 is substantially perpendicular to the direction of flow H. Cooling holes 106 can also be provided in a staggered formation or other formation on wall 100. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4A:
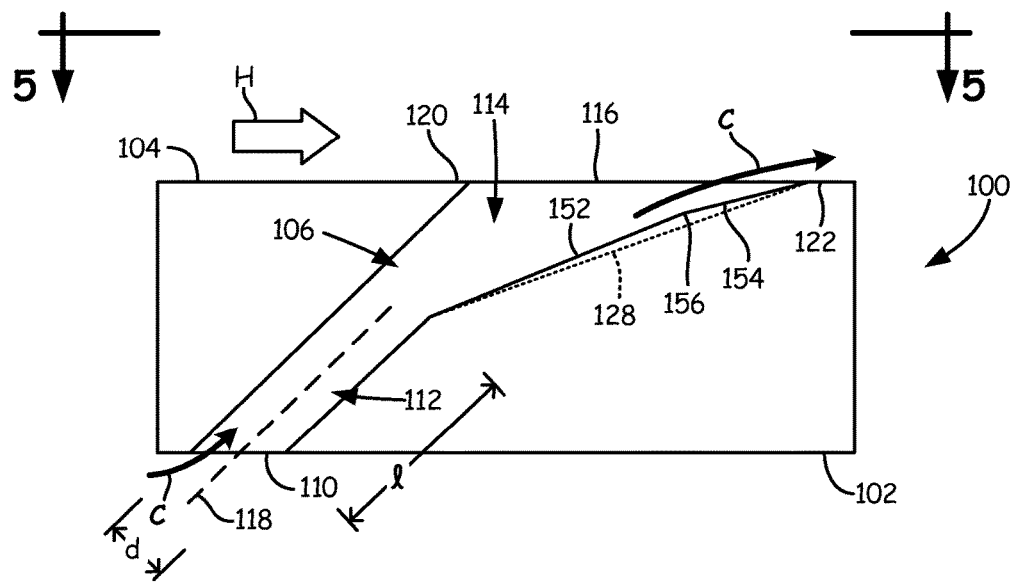
FIG. 4A is a sectional view of the multi-lobed cooling hole of FIG. 3 taken along the line 4A-4A.
Figure 4B:
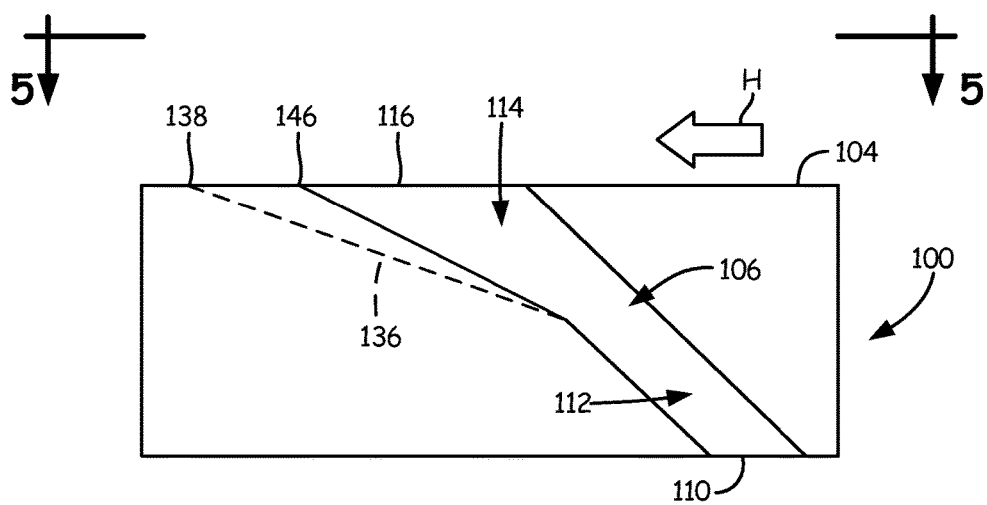
FIG. 4B is a sectional view of the multi-lobed cooling hole of FIG. 3 taken along the line 4B-4B.
Figure 5:
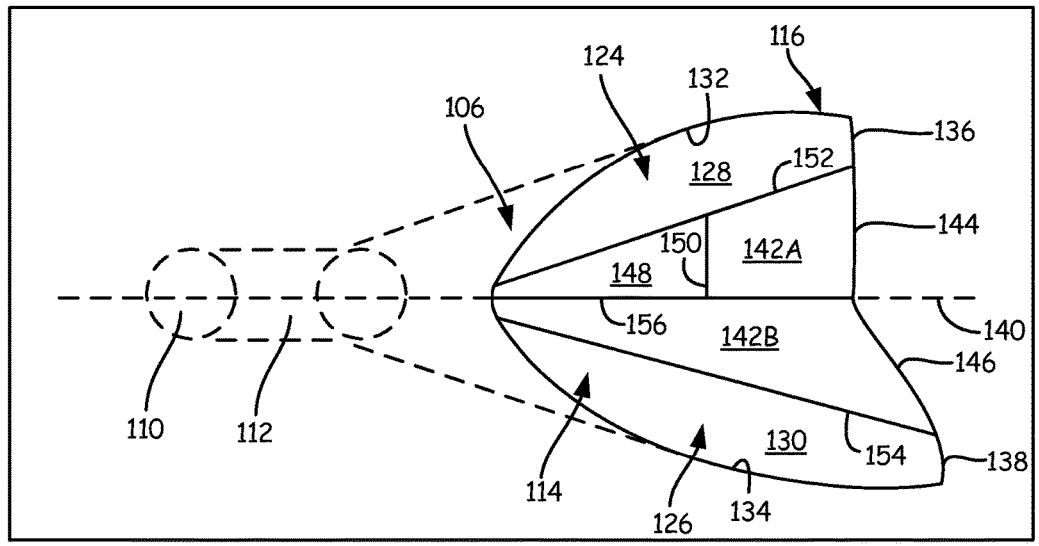
FIG. 5 is a view of the multi-lobed cooling hole of FIGS. 4A and 4B taken along the lines 5-5.

FIGS. 4A, 4B and 5 illustrate one embodiment of cooling hole 106 in greater detail. FIG. 4A illustrates a sectional view of multi-lobed film cooling hole 106 of FIG. 3 taken along the line 4A-4A. FIG. 4B illustrates a sectional view of multi-lobed film cooling hole 106 of FIG. 3 taken along the line 4B-4B. FIG. 5 illustrates a view of cooling hole 106 of FIGS. 4A and 4B taken along the lines 5-5. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of air through cooling hole 106. In exemplary embodiments, metering section 112 has a substantially constant flow area from inlet 110 to first diffusing section 114. Metering section 112 can have circular, oblong (oval or elliptical), racetrack (oval with two parallel sides having straight portions), crescent, cusp or dual-cusp shaped cross sections. In FIGS. 4A, 4B and 5, metering section 112 has a circular cross section. Circular metering sections 112 have a length l and diameter d. In some embodiments, circular metering section 112 has a length l according to the relationship: d≤l≤3d. That is, the length of metering section 112 is between one and three times its diameter. The length of metering section 112 can exceed 3d, reaching upwards of 30d. In alternate embodiments, metering section 112 has a non-circular cross section, such as an oblong, racetrack-shaped, crescent, cusp or dual-cusp shaped cross section, and their metering sections 112 have a length l and hydraulic diameter $d_h$. In some embodiments, metering section 112 has a length l according to the relationship: $d_h$≤l≤$3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIGS. 4A and 4B (i.e. metering section 112 is not perpendicular to wall 100). Metering section 112 has a longitudinal axis represented by numeral 118.

As shown best in FIG. 5, diffusing section 114 includes two channel-like lobes 124 and 126 having different shapes. Lobe 124 is described in the U.S. patent application Ser. No. 13/544,090, filed on Jul. 9, 2012 and entitled "MULTI-LOBED COOLING HOLE", which is incorporated by reference. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (the side walls are represented by lines 132 and 134, respectively) and a downstream end (trailing edges 136 and 138, respectively). FIGS. 4A and 4B best illustrate the longitudinal divergence (from longitudinal axis 118), while FIG. 5 best illustrates the lateral divergence (from centerline axis 140, an axis drawn through the center of metering section 112). As shown in FIG. 5, first lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126. As described below in greater detail, first lobe 124 and second lobe 126 have different shapes.

Diffusing section 114 also includes transition regions 142A and 142B. Transition regions 142A and 142B extend from the lobes towards the center of cooling hole 106. Transition region 142A is located between first lobe 124 and second lobe 126 as shown in FIG. 5 and extends to downstream end 144. Transition region 142B is located between transition region 142A and second lobe 126 as shown in FIG. 5 and extends to downstream end 146. Depending on the location of cooling hole 106, transition regions 142A and 142B can have varying lateral and longitudinal lengths and extend from respective lobes 124 and 126 at various angles (inclinations). In the embodiment shown in FIG. 5, transition regions 142A and 142B meet along centerline axis 140. In other embodiments, transition regions 142A and 142B do not meet along centerline axis 140, but closer to side wall 132 or to side wall 134. Because second lobe 126 is longer than first lobe 124, transition region 142A has a shape different than transition region 142B.

Second lobe 126 is not a mirror image of first lobe 124. Instead, second lobe 126 is formed so that trailing edge 138 of second lobe 126 is located farther from inlet 110 than trailing edge 136 of first lobe 124. That is, the distance from inlet 110 to trailing edge 138 is larger than the distance from inlet 110 to trailing edge 136. Due to the difference in the length of lobes 124 and 126, outlet 116 is asymmetric. Downstream ends 144 and 146 form portions of outlet 116. As shown in FIG. 5, downstream end 144 is located between trailing edge 136 of first lobe 124 and centerline axis 140 and downstream end 146 is located between trailing edge 138 of second lobe 126 and centerline axis 140. Downstream ends 144 and 146 meet at centerline axis 140. In other embodiments, downstream ends 144 and 146 do not meet at centerline axis 140, but closer to one of trailing edges 136 and 138 of first and second lobes 124 and 126, respectively. In the embodiment shown in FIG. 5, downstream end 144 is generally perpendicular to centerline axis 140. Because second lobe 126 is longer than first lobe 124, downstream end 146 is not parallel to downstream end 144, and is instead angled with respect to downstream end 144.

In the embodiment illustrated in FIG. 5, transition region 142A also includes inclined portion 148. Inclined portion 148 is located adjacent to and extends from bottom surface 128 of first lobe 124. Inclined portion 148 extends from first lobe 124 towards centerline axis 140 and second lobe 126. Depending on the location of cooling hole 106, inclined portion 148 can have varying lateral and longitudinal lengths and extend from lobe 124 at various angles (inclinations). In the embodiment shown in FIG. 5, first inclined portion 148 meets transition region 142A along ridge 150. Like the side walls and bottom surfaces, inclined portion 148 and transition regions 142A and 142B direct cooling air C through lobes 124 and 126 of diffusing section 114.

First lobe 124 meets transition region 142A at interface 152 and second lobe 126A meets transition region 142B at interface 154. Interfaces 152 and 154 can be straight or curved. Embodiments of cooling holes 106 can be positioned on wall 100 radially with respect to the high temperature gas flow as shown in FIG. 3 and described above or positioned so that the flow of air through cooling hole 106A is in substantially the same direction as the high temperature gas flow. The extension of second lobe 126 allows cooling fluid flowing through cooling hole 106 to form three-dimensional cooling films along second wall surface 104.

In some embodiments, transition region 142A and transition region 142B meet together to form a ridge as shown in FIG. 5. Ridge 156 is located between first lobe 124 and second lobe 126 at the intersection of first inclined portion 148 and second inclined portion 150. Ridge 156 aids in separating and directing the flow of cooling air C into first lobe 124 and second lobe 126. The location and angle of ridge 156 within diffusing section 114 can vary to direct cooling air C within diffusing section 114 to suit the location and desired flow profile of cooling hole 106.

Ridge 156 can extend longitudinally to varying degrees between metering section 112 and transition regions 142A and 142B. Ridge 156 can extend upstream all the way to metering section 112, beginning where metering section 112 and diffusing section 114 meet as shown in FIGS. 4A and 4B. Alternatively, ridge 156 can begin farther downstream (closer to outlet 116). Ridge 156 can extend downstream to outlet 116 as shown in FIG. 4. Alternatively, ridge 152 can converge with bottom surfaces 128 and 130 upstream of outlet 116. Corresponding changes to the longitudinal lengths of inclined portion 148 accompany any change in the longitudinal extension of ridge 156.

Transition regions 142A and 142B can take various shapes and have different configurations depending on the location and desired flow profile of cooling hole 106. The bottom surface of transition regions 142A and 142B can be flat or curved. A curved (e.g., longitudinally convex) bottom surface of transition region 142A or 142B can facilitate improved flow attachment due to the Coanda effect.

The shapes of first lobe 124 and second lobe 126 define flow volumes created by the lobes. Differences in lobe shapes produce differences in the flow volumes. Cooling hole 106 can be positioned on wall 100 to take advantage of the different flow volumes of lobes 124 and 126. Cooling hole 106 can be oriented so that areas of wall 100 that require greater film cooling receive cooling fluid from the lobe having a larger flow volume. For example, in some embodiments a lobe with a larger flow volume (i.e. larger size) is located downstream from the lobe having the smaller flow volume. As shown in cooling holes 106 illustrated in FIG. 3, the larger lobe is located downstream from the smaller lobe with respect to the high temperature gas flow (arrow H). This orientation provides a cooling hole with the ability to concentrate film cooling effectiveness at a particular location along wall 100 while still providing a general cooling film along wall 100. Such an orientation can be used to cool various features on wall 100 such as platforms, endwalls and various curved features of airfoils.

In some embodiments, cooling holes 106 are positioned so that air passing through cooling holes 106 travels in a generally different direction with respect to the high temperature gases flowing along second wall surface 104 (represented by arrow H in FIG. 3). As shown in FIG. 3, the centerline axis of cooling hole 106 can be oriented radially when compared to high temperature gas flow H. Angle $\alpha$ represents the angle between centerline axis 140 and flow H. In exemplary embodiments, angle $\alpha$ is between about 50° and about 90°. In some embodiments, angle $\alpha$ is between about 60° and about 80°.

Figure 6:
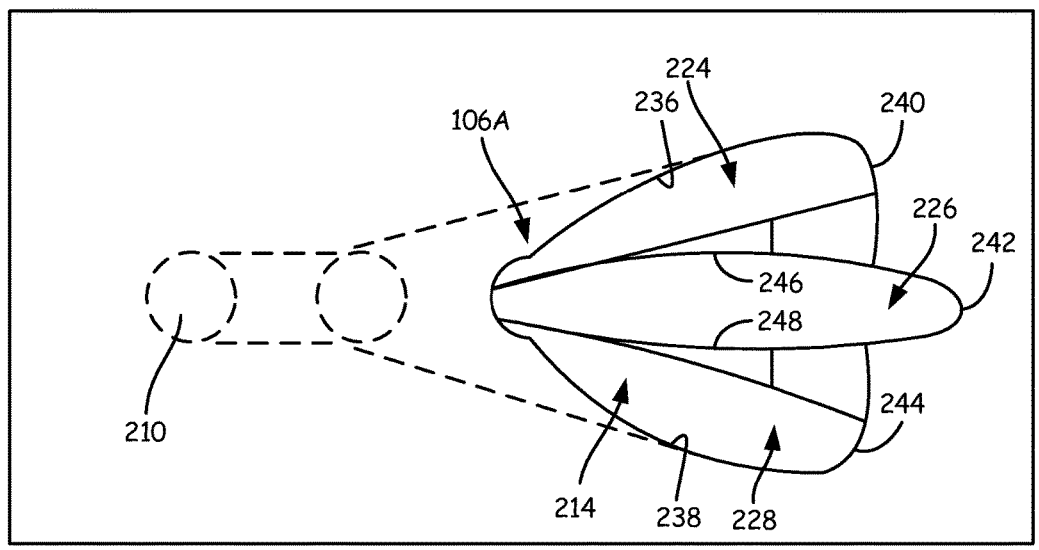
FIG. 6 is a view of another embodiment of a multi-lobed cooling hole.

FIG. 6 illustrates another embodiment of a cooling hole having lobes of different shape. FIG. 6 illustrates cooling hole 106A, which is similar to the cooling holes described in U.S. patent application Ser. No. 13/544,101, filed on Jul. 9, 2012 and entitled "TRI-LOBED COOLING HOLE AND METHOD OF MANUFACTURE". Diffusing section 214 includes three lobes 224, 226 and 228. Each lobe 224, 226 and 228 has a bottom surface (bottom surfaces 230, 232 and 234, respectively). Lobes 224 and 228 each have a side wall along the outer edge of diffusing section 214 (represented in FIG. 6 by side wall projections 236 and 238, respectively). Each lobe 224, 226 and 228 also has a downstream end (trailing edges 240, 242 and 244, respectively). Downstream ends 240, 242 and 244 are each located a distance from inlet 210. Lobes 224 and 226 meet along ridge 246, and lobes 226 and 228 meet along ridge 248. Each lobe 224, 226 and 228 diverges longitudinally from metering section 212.

At least one of the downstream ends 240, 242 and 244 is located a distance from inlet 210 different from the other downstream ends. In the embodiment illustrated in FIG. 6, downstream ends 240 and 244 of first lobe 224 and third lobe 228, respectively, extend the same distance from inlet 210 while downstream end 242 of second lobe 226 extends a greater distance from inlet 210. Like cooling hole 106 shown in FIG. 5, extending second lobe 226 can allow cooling fluid flowing through cooling hole 106B to form three-dimensional cooling films.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A gas turbine engine component subjected to a flow of high temperature gas can include a wall having first and second wall surfaces and a cooling hole extending through the wall. The cooling hole can include an inlet located at the first wall surface, an outlet located at the second wall surface, a metering section extending downstream from the inlet, and a diffusing section extending from the metering section to the outlet. The diffusing section can include a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance different from the first distance, and a first transition region positioned between the first and second lobes, the first transition region having a third downstream end adjacent the outlet The component of the preceding paragraph can optionally include, additionally and/or alternatively any, one or more of the following features, configurations and/or additional components:

A gas turbine engine component according to an exemplary embodiment of this disclosure, can include, among other possible things, a metering section having a longitudinal axis where the longitudinal axis of the metering section is oriented radially at an angle between about 50° and 90° relative to an axis representing flow of the high temperature gas flowing past the component.

A gas turbine engine component according to an exemplary embodiment of this disclosure, can include, among other possible things, a second lobe that diverges laterally from the metering section.

A gas turbine engine component according to an exemplary embodiment of this disclosure, can include, among other possible things, that the second distance is greater than the first distance.

A gas turbine engine component according to an exemplary embodiment of this disclosure, can include, among other possible things, a first lobe that forms a first flow volume and a second lobe that forms a second flow volume.

A gas turbine engine component according to an exemplary embodiment of this disclosure, can include, among other possible things, a first lobe that is located upstream of the second lobe with respect to high temperature gas flowing past the component where the second flow volume is greater than the first flow volume.

A gas turbine engine component according to an exemplary embodiment of this disclosure, can include, among other possible things, a diffusing section that further includes a second transition region positioned between the first transition region and the second lobe, the second transition region having a fourth downstream end adjacent the outlet, where the metering section comprises a longitudinal axis, where the third downstream end is generally perpendicular to the longitudinal axis of the metering section, and where the fourth downstream end is angled with respect to the longitudinal axis of the metering section.

A gas turbine engine component according to an exemplary embodiment of this disclosure, can include, among other possible things, a diffusing section that further includes a third lobe spaced from the first lobe by the second lobe and diverging longitudinally and laterally from the metering section.

A gas turbine engine component according to an exemplary embodiment of this disclosure, can include, among other possible things, a third lobe having a fifth downstream end spaced from the inlet by a third distance where the first and third distances are substantially equal.

A wall of a component of a gas turbine engine subjected to a flow of high temperature gas can include first and second wall surfaces, an inlet located at the first wall surface, an outlet located at the second wall surface, a metering section commencing at the inlet and extending downstream from the inlet, and a diffusing section extending from the metering section and terminating at the outlet. The diffusing section can include a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance different from the first distance, and a first transition region positioned between the first and second lobes, the first transition region having a third downstream end adjacent the outlet The wall of the preceding paragraph can optionally include, additionally and/or alternatively any, one or more of the following features, configurations and/or additional components:

A wall of a component of a gas turbine engine according to an exemplary embodiment of this disclosure, can include, among other possible things, a metering section having a longitudinal axis where the longitudinal axis of the metering section is oriented radially at an angle between about 50° and 90° relative to an axis representing flow of the high temperature gas flowing past the component.

A wall of a component of a gas turbine engine according to an exemplary embodiment of this disclosure, can include, among other possible things, a second lobe that diverges laterally from the metering section.

A wall of a component of a gas turbine engine according to an exemplary embodiment of this disclosure, can include, among other possible things, that the second distance is greater than the first distance.

A wall of a component of a gas turbine engine according to an exemplary embodiment of this disclosure, can include, among other possible things, a first lobe that forms a first flow volume and a second lobe that forms a second flow volume.

A wall of a component of a gas turbine engine according to an exemplary embodiment of this disclosure, can include, among other possible things, a first lobe that is located upstream of the second lobe with respect to high temperature gas flowing past the component where the second flow volume is greater than the first flow volume.

A wall of a component of a gas turbine engine according to an exemplary embodiment of this disclosure, can include, among other possible things, a diffusing section that further includes a second transition region positioned between the first transition region and the second lobe, the second transition region having a fourth downstream end adjacent the outlet, where the metering section comprises a longitudinal axis, where the third downstream end is generally perpendicular to the longitudinal axis of the metering section, and where the fourth downstream end is angled with respect to the longitudinal axis of the metering section.

A wall of a component of a gas turbine engine according to an exemplary embodiment of this disclosure, can include, among other possible things, a diffusing section that further includes a third lobe spaced from the first lobe by the second lobe and diverging longitudinally and laterally from the metering section.

A wall of a component of a gas turbine engine according to an exemplary embodiment of this disclosure, can include, among other possible things, a third lobe having a fifth downstream end spaced from the inlet by a third distance, wherein the first and third distances are substantially equal.

A gas turbine engine component subjected to a flow of high temperature gas can include a wall having first and second wall surfaces and a cooling hole extending through the wall. The cooling hole can include an inlet located at the first wall surface, an outlet located at the second wall surface, a metering section extending downstream from the inlet and a diffusing section extending from the metering section to the outlet. The diffusing section can include a first lobe diverging longitudinally and laterally from the metering section and having a first downstream end adjacent the outlet and spaced from the inlet by a first distance, a second lobe diverging longitudinally from the metering section and having a second downstream end adjacent the outlet and spaced from the inlet by a second distance greater than the first distance, and a third lobe spaced from the first lobe by the second lobe and diverging longitudinally and laterally from the metering section and having a fifth downstream end spaced from the inlet by a third distance, wherein the first and third distances are substantially equal.

The invention claimed is:

1. A gas turbine engine component subjected to a flow of high temperature gas, the component comprising:
    a wall having first and second wall surfaces; and
    a cooling hole extending through the wall and comprising:
        an inlet located at the first wall surface;
        an outlet located at the second wall surface;
        a metering section extending downstream from the inlet; and
        a diffusing section extending from the metering section to the outlet and comprising:
            a first lobe diverging longitudinally and laterally from the metering section and having a first downstream end adjacent the outlet and spaced from the inlet by a first distance;
            a second lobe diverging longitudinally from the metering section and having a second downstream end adjacent the outlet and spaced from the inlet by a second distance different from the first distance;
            a first transition region positioned between the first and second lobes, the first transition region comprising a third downstream end adjacent the outlet; and
            a second transition region positioned between the first transition region and the second lobe, the second transition region comprising a fourth downstream end adjacent the outlet, wherein the metering section comprises a longitudinal axis, and wherein the third downstream end is generally perpendicular to the longitudinal axis of the metering section, and wherein the fourth downstream end is angled with respect to the longitudinal axis of the metering section.

2. The component of claim 1, wherein the longitudinal axis of the metering section is oriented radially at an angle between about 50° and 90° relative to an axis representing flow of the high temperature gas flowing past the component.

3. The component of claim 1, wherein the second lobe diverges laterally from the metering section.

4. The component of claim 1, wherein the second distance is greater than the first distance.

5. The component of claim 1, wherein the first lobe forms a first flow volume and the second lobe forms a second flow volume.

6. The component of claim 1, wherein the first lobe is located upstream of the second lobe with respect to high temperature gas flowing past the component, and wherein the second flow volume is greater than the first flow volume.

7. A wall of a component of a gas turbine engine subjected to a flow of high temperature gas, the wall comprising:
    first and second wall surfaces;
    an inlet located at the first wall surface;
    an outlet located at the second wall surface;
    a metering section commencing at the inlet and extending downstream from the inlet; and
    a diffusing section extending from the metering section and terminating at the outlet, the diffusing section comprising:
        a first lobe diverging longitudinally and laterally from the metering section and having a first downstream end adjacent the outlet and spaced from the inlet by a first distance;
        a second lobe diverging longitudinally from the metering section and having a second downstream end adjacent the outlet and spaced from the inlet by a second distance different from the first distance;
        a first transition region positioned between the first and second lobes, the first transition region comprising a third downstream end adjacent the outlet; and
        a second transition region positioned between the first transition region and the second lobe, the second transition region comprising a fourth downstream end adjacent the outlet, wherein the metering section comprises a longitudinal axis, and wherein the third downstream end is generally perpendicular to the longitudinal axis of the metering section, and wherein the fourth downstream end is angled with respect to the longitudinal axis of the metering section.

8. The wall of claim 7, wherein the longitudinal axis of the metering section is oriented radially at an angle between about 50° and 90° relative to an axis representing flow of the high temperature gas flowing past the component.

9. The wall of claim 7, wherein the second lobe diverges laterally from the metering section.

10. The wall of claim 7, wherein the second distance is greater than the first distance.

11. The wall of claim 7, wherein the first lobe forms a first flow volume and the second lobe forms a second flow volume.

12. The wall of claim 7, wherein the first lobe is located upstream of the second lobe with respect to high temperature gas flowing past the component, and wherein the second flow volume is greater than the first flow volume.

* * * * *